United States Patent [19]

Willis

[11] 4,326,818

[45] Apr. 27, 1982

[54] TECHNIQUES FOR THE STORAGE OF WATER

[76] Inventor: Dudley L. Willis, 108 Briar La., Newark, Del. 19711

[21] Appl. No.: 116,642

[22] Filed: Jan. 29, 1980

Related U.S. Application Data

[63] Continuation of Ser. No. 951,738, Oct. 16, 1978, which is a continuation of Ser. No. 848,716, Nov. 4, 1977.

[51] Int. Cl.$^3$ ............................................. B65G 5/00
[52] U.S. Cl. .................................... 405/55; 405/266; 405/270
[58] Field of Search .............................. 405/53-58, 405/266-270

[56] References Cited

U.S. PATENT DOCUMENTS

| | | | |
|---|---|---|---|
| 1,159,055 | 11/1915 | Lowe | 405/55 X |
| 3,175,614 | 3/1965 | Wyllie | 405/53 X |
| 3,354,656 | 11/1967 | Fahnestock | 405/267 X |
| 3,504,496 | 4/1970 | Hnot | 405/53 |
| 3,800,544 | 4/1974 | Nakanishi | 405/266 |
| 3,802,252 | 4/1968 | Renshaw | 405/270 |
| 3,967,451 | 7/1976 | Garbe | 405/57 |

*Primary Examiner*—Dennis L. Taylor
*Attorney, Agent, or Firm*—Mortenson & Uebler

[57] ABSTRACT

Water is stored in a sub-surface reservoir that has flexible walls of grouted in situ soils. The water is stored in the voids between soil particles within the reservoir. Usable voids within the container vary from about 20% to about 40% of the totally enclosed volume of the reservoir. The bottom of the reservoir is a natural impervious sub-strata. No excavating of soil is required as they are, generally, sand and gravel deposits that overlie impervious aquicludes. A grout pipe is inserted into the ground by any conventional method, and then grout is continuously injected through the pipe under pressure as the grout pipe is being withdrawn, thus forcing the grout into adjacent soils. Selective positioning of successive grout pipes leads to the formation of a wall.

10 Claims, 6 Drawing Figures

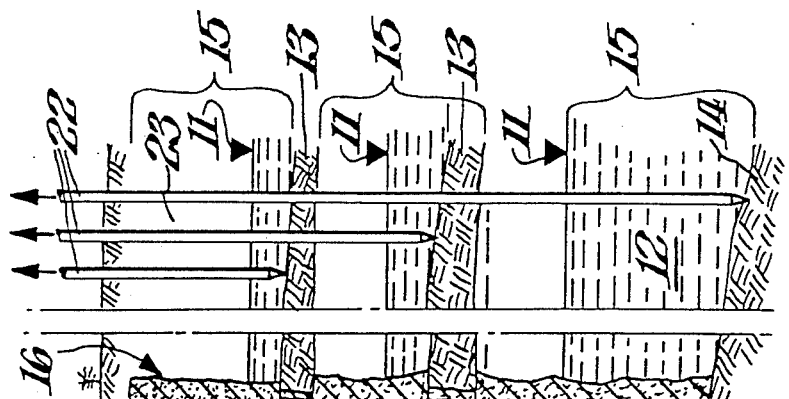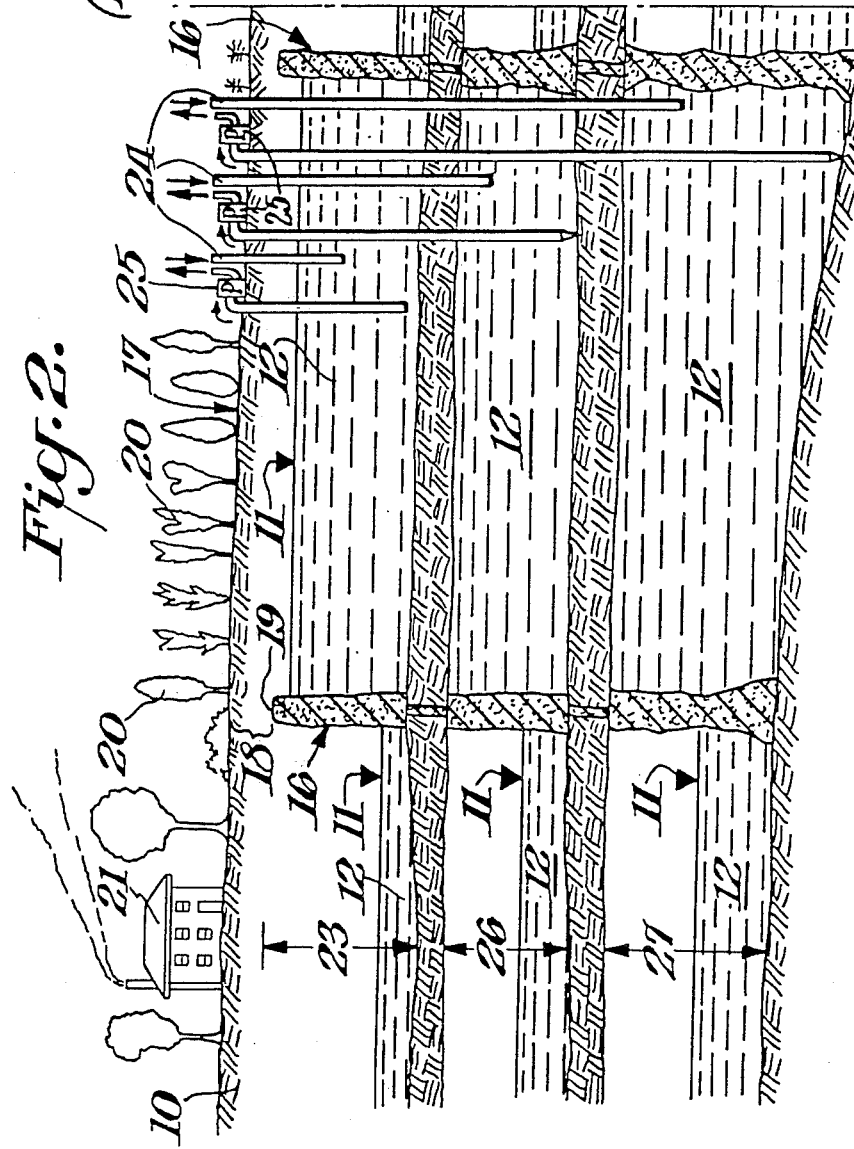

TECHNIQUES FOR THE STORAGE OF WATER

This is a continuation of my application Ser. No. 951,738, filed Oct. 16, 1978, which, in turn, was a continuation of my application Ser. No. 848,716, filed Nov. 4, 1977.

BACKGROUND OF THE INVENTION

Water, its discovery, preservation and distribution, becomes increasingly costly. Thus, the salvage and storage of water are important factors throughout the world. It is well known that sand and gravel deposits form major water-supplying aquifers and, at the same time, aggregates for construction work. It is also appreciated that such deposits lie on or above basement rock and are frequently separated as horizontal layers by an impervious aquiclude, which term appears in Ser. No. 848,716 and refers to such "natural impervious substrata". Underground water is found in the interstices above such beds which water permeates from above, coming from rains or coming via underground streams. There have been proposals to trap such water, but the tank storage proposed has involved tank walls of concrete, timber, steel or massive stone masonry. Further, such storage has been within a clear interior and fabricated tank bottoms have been provided. U.S. Pat. No. 3,967,451 is one such prior art, for example. Other prior art includes U.S. Pat. No. 3,380,252; British Pat. No. 1,013,025; U.S. Pat. No. 3,800,544; and U.S. Pat. No. 3,802,204. None of these references accomplishes the objectives of this invention.

One objective of this invention is to provide a water reservoir large enough to provide protection against long term water supply fluctuations. Another purpose is the provision of such a reservoir in an environmentally sound manner and at economic and low cost. Still another aim is to provide water storage areas without the need to remove land from its current use or to displace residents or real estate improvements. These and other goals of this invention will appear hereinafter.

NATURE OF THE INVENTION

The objectives of this invention are accomplished by injecting into the ground a water impervious material to fill the soil interstices and to form a flexible wall which extends downwardly sufficiently to reach and to be in water-sealing relationship with a natural stone base or an impervious aquiclude and which wall is continuous circular, rectangular or the like, and which fully confines all of the material, solid and liquid, as a sub-surface reservoir. In other words, all the water within the volume of material is now trapped and can be added to or pumped out of the reservoir.

It will be appreciated that the encircling walls may extend downwardly past the first rock or impervious aquicludes to reach other such natural bottoms or strata. Further, it will be understood that the flow of water that would normally come underground to the now trapped volume of water will not flow naturally into the reservoir but around it but that water can be withdrawn from that contiguous flow and fed into the reservoir as required in order to assure maximum storage.

The objectives of this invention will be further understood by reference to the drawings and description below, all of which is given for illustrative purposes and is not limitative.

DESCRIPTION OF THE DRAWINGS

FIG. 1 is a cross-sectional view of wells reaching subterranean water with the conventional pumps and the like not shown for convenience;

FIG. 2 is a cross-section of ground showing the underground flow of water and a volume of it trapped by the use of this invention along with means to feed to or withdraw water from the trapped volume;

BRIEF DESCRIPTION OF THE INVENTION

Figure 3:
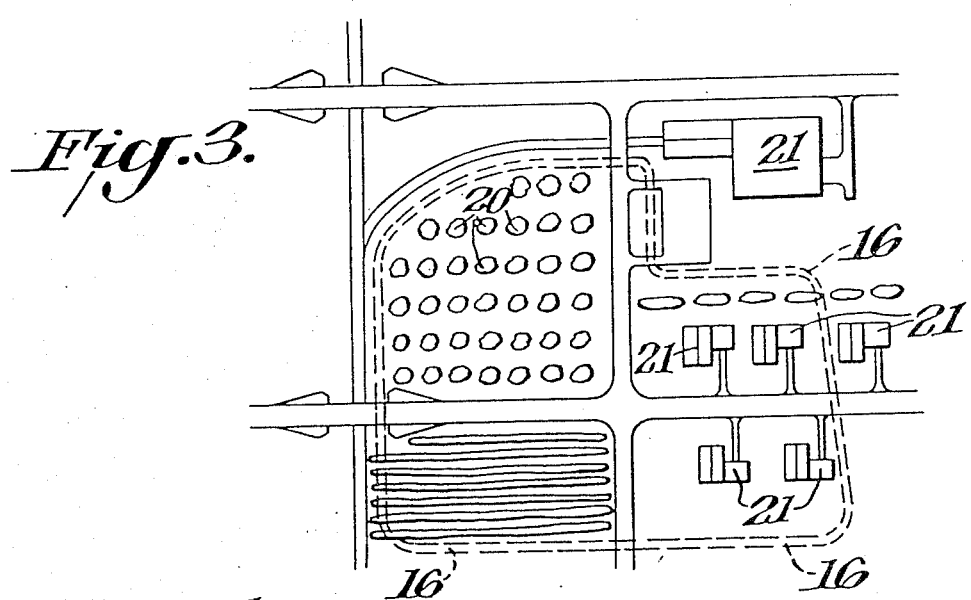
FIG. 3 is a plan view of a reservoir of this invention shown below the ground with conventional pre-existing structures still in place.

After marking out the line of the wall to be constructed, one inserts the grout pipe until the desired bed rock or impervious aquiclude is reached. He then inserts grout under pressure as the pipe is being withdrawn so as to form a plug of impervious material. This is repeated along the wall perimeter, so as to form a line of plugs which touch or almost touch. He then makes another round of settings and injections so as to place plugs between plugs created previously, thus forming a continuous wall that is in water-sealing relationship with the water trapped in the enclosure. Conventional wells are constructed to withdraw trapped water and feed lines are supplied to add water as needed.

DETAILED DESCRIPTION OF THE INVENTION

As shown in FIG. 2, earth 10 is made up of particulate material such as sand and gravel and fines which frequently are in the form of natural sand or gravel deposits and water 12. Water levels are indicated by mark 11. The water can be moving downwardly or laterally or be trapped in some sub-surface basin, the downward flow being stopped by impervious aquicludes 13 or by a basement or bed rock layer 14. A plurality of aquicludes is shown each with an aquifer 15 above it.

At 16 is shown the impervious enclosing wall mentioned above. As can be seen in FIG. 3, it is a continuous encircling wall 16. The volume enclosed may be immense with the wall encircling such surface features as buildings 21 and trees 20 and the other major surface features. The top of the wall 16 is not seen at the ground level 17, since a space 18 is left between the top 19 of wall 16 and ground level 17 to allow for normal water filtration and ordinary conditions to exist for adjacent trees 20 and buildings 21. This is the usual condition but under other circumstances it may be desirable for the wall to extend to the surface or above it, as explained below.

In forming wall 16, the voids in the native soil are filled by injecting grout into the voids, thus creating an impervious membrane or wall, the thickness of which may vary from a few inches to several feet depending upon the economics of balancing labor, time and materials or the physical composition of the soil or matter into which the grout is to be injected. The grout may be in the form of a clay, any one of a number of commercially available grouts, or a combination of two or several of these. The material forming tank wall 16 may be pressure-grouted and jelled into place. In addition to commercial grouts such as tar, asphalt, "AM-9", obtainable from Union Carbide Corp., clays, lime, degradable pulps, concrete flexiblized with rubber such as neoprene, natural rubber and the like, one may use synthetic polymeric materials, as for example, the many polymeric silicones available from such companies as Philadelphia Quartz Co. Mixtures of such materials may also be used.

In any event the membrane or wall 16 are restrained or supported by the adjacent native earth, and sub-surface vibratory compaction can be used before, during or after injection of wall 16 so that the possibility of settlement or leakage is reduced while at the same time effecting s maximum density in and near the walls with a minimum of grout, there being, therefore little or no need for adding separate structural elements for wall strength. Thus, it will be appreciated that wall 16 will not be straight or smooth surfaced but will be irregular as shown in the figures and will be inherently effective retaining walls.

The walls 16 prevent the flow of water out of the trapped space as well as laterally directly into it. Some filling of the resultant reservoir may occur from rainfall as well as from some lateral movement of water occurring during periods of high ground water elevation. However, conventional wells 22 can be installed in contiguous sections 30 or at some remote location and these may be used to withdraw water from the aquifers that were normally feeding the lower portion of the trapped volume prior to the construction of the reservoir. While such withdrawn water could be merely piped onto the top surface 17 of the ground, it could also be fed to the charging wells 24, and conventional wells 25 can be used to withdraw water from the reservoir. As noted in FIGS. 1 and 2, a given well 22, 24 or 25 may be extended to a given aquifer, there being a well for each aquifer that is to be used.

In constructing wall 16 it is to be noted that if an impervious aquiclude is to be drilled through in order to reach a usable soil deposit at a lower elevation, no continuous grout wall 26 is needed, since the material in the natural aquiclude can be used as part of wall 16. If fractures in the bed rock or aquiclude are present such can be located and grouted by conventional techniques.

It is to be understood that this invention can be used to create water reservoirs in the absence of usable aquifers or in places where there is but little subsurface water or its amount fluctuates greatly. After construction of the walls 16 in accordance with this invention, one need only pump water into the tank taking the water from nearby existing sources such as wells or rivers or creeks or from barged or hauled sources. Storage of large quantities of water can thus be effectively stored in an economical manner. Still further, if an aquifer has become polluted as, for example, the result of a landfill operation, walls 16 of this invention may be constructed to trap the pollutants. Also, walls 16 may be used to back up ground water otherwise lost to brackish or salt waters, backing up water thereby raising the ground water elevation or totally filling an existing aquifer.

As shown in FIG. 3, reservoir walls 16 of this invention are installed in a location which has pre-existing elements such as trees 20 and buildings 21. The walls skirt all such items, thus enabling one to make the reservoir underlie existing farmland, orchards and industrial and residential areas with their buildings and roads all of which is left undisturbed.

Figure 4:
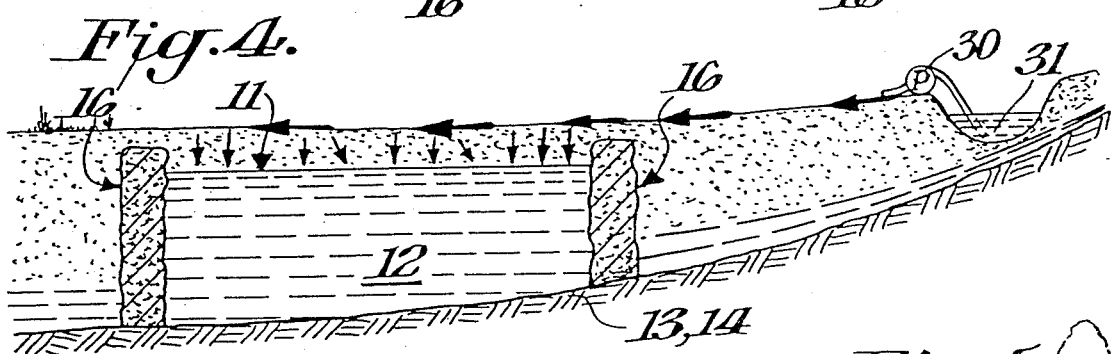
FIG. 4 is a cross-sectional view of an embodiment of this invention adapted to the diverting of water from a remote stream.

FIG. 4 shows an embodiment in which water diverted from remote stream 31 by use of a dam or ditch making the water flow to form a layer or flow of water above the reservoir walls 16 which have been located at a suitable place for economic storage and use. The water percolates downwardly into a reservoir of this invention to create a body of water the level of which is designated as 11. The reservoir is located for the natural impervious aquiclude 13 or basement or bed rock 14 present there. This embodiment of the present invention allows one to divert water from a substantially supplied stream and filter it through native surface materials into the reservoir, the water otherwise passing downstream to larger bodies of water such as a larger river, a lake or the ocean.

Figure 5:
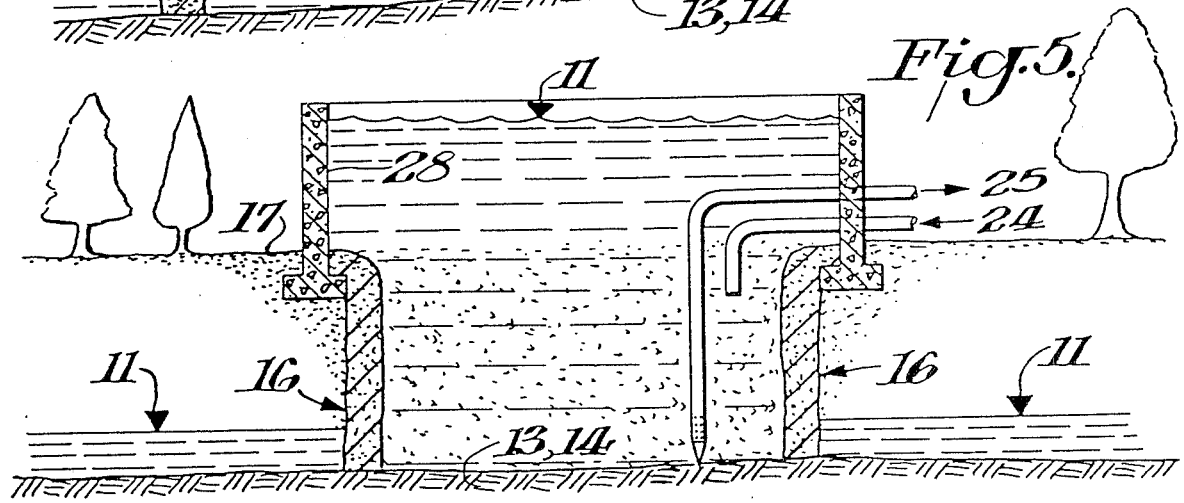
FIG. 5 is a cross-sectional view of still another embodiment illustrating modes of above ground constructions as means for increasing capacities of reservoirs of this invention.
Figure 6:
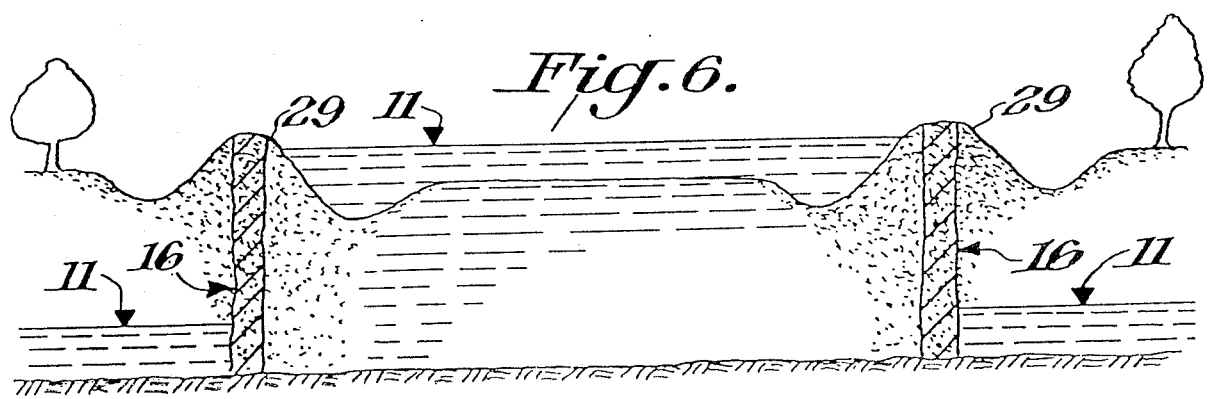
FIG. 6 is a cross-sectional view showing a different above ground construction.

In event that a reservoir such as shown in FIG. 1 needs to be increased in its capacity, the sub-surface walls 16 can be extended upwardly making them extend above the ground to desired heights through the use of rigid or flexible extensions 28, shown in FIG. 5. If desired, a dike 29 (FIG. 6) can be constructed above a wall 16 instead of using extension 28. FIG. 5 and FIG. 6 show the use of these, it being understood that the desired increase in capacity could be gained by using dikes only or extensions 28 only or a combination of them, as desired.

The principles of this invention can be applied in arid or desert areas. Water can be pumped into the sub-surface reservoir so as to build up soil moisture to the extent that agricultural crops can be planted and harvested even though the natural aquifer or rock bottom is too far below the ground level for the roots to reach water or for capillary water to rise naturally to be within their distance. Thus, arid lands can be farmed and marginal lands can be farmed more profitably.

Also, aquifers that naturally contain water of poor quality can be upgraded by pumping that out and replacing it or diluting it as necessary in order to produce acceptable water. As shown in the figures, aquifers lying below a primary aquifer or aquifers that are not up to capacity may receive and store water. A suitable dry earthen deposit may be converted to an aquifer.

Application of the principles of this invention has a number of additional advantages. When constructing a large reservoir, flooding of roads and homesites does not occur. Relocation of people and land improvements are not involved. The land occupied by the tank is "free" land in the sense that no ponds are formed and the ground surface remains available for normal use. Massive concrete, timber, steel or stone masonry structures are avoided. No major adverse environmental impact occurs. Since the water is stored below the ground, mosquitoes and the breeding of such disease bearing insects are not possible. Also, expensive excavations and construction of tank bottoms are avoided. The reservoir capacity is, however, limited to the enclosed volume less the volume of soil contained in it. This limits the usable capacity to between 20% and 40% of the total volume, this space stemming, of course, from the pores between soil particles.

Instead of storing water in the reservoirs of this invention one may store other liquids, such as kerosene, light oils or similar fluid chemicals.

While the invention has been disclosed herein in connection with certain embodiments and certain structural and procedural details related to water, it is clear that changes, modifications or equivalents can be used by those skilled in the art; accordingly, such changes within the principles of the invention are intended to be included within the scope of the claims below.

I claim:

1. A reservoir for storing water or other liquids underground, which reservoir comprises a substantially flexible, impervious, continuous closed wall enclosing a predetermined land area of any desired size and any desired shape, said wall extending downwardly underground to a natural, substantially impervious aquiclude and being in water-sealing relationship with the top surface of said aquiclude, said wall being substantially impervious to the passage of liquids therethrough, said wall being made of a grouting material which will yield to natural ground movement without failure, said wall extending downwardly to said aquiclude and being horizontally supported by the soil on either side thereof, said water being stored within the voids between the soil particles within said reservoir.

2. A reservoir in accordance with claim 1 in which said wall is a continuous wall enclosing a volume of soil above said impervious aquiclude the top surface of which aquiclude comprises the bottom of said reservoir.

3. A reservoir in accordance with claim 1 in combination with a well adapted to remove water or other liquids from and, as desired, to add water or other liquids to said reservoir.

4. A reservoir in accordance with claim 1 in combination with a means located apart from said reservoir which is a means for adding water or other liquids to said reservoir.

5. A process for storing water or other liquids in an underground reservoir which comprises forming a substantially flexible, impervious, continuous closed wall enclosing a predetermined land area of any desired size and any desired shape, said wall extending downwardly underground to a natural, substantially impervious aquiclude and being in water-sealing relationship with the top surface of said aquiclude, said wall being substantially impervious to the passage of liquids therethrough, said wall being of a grouting material which will yield to natural ground movement without failure, said wall extending downwardly to said aquiclude and being horizontally supported by the soil on either side thereof, forming said wall by injecting said grouting downwardly to said aquiclude, and storing the said water or other liquids within the voids between the soil particles within said reservoir.

6. A method in accordance with claim 5 in which the volume of said voids varies from about 20% to about 40% of the totally enclosed volume of said reservoir.

7. A process in accordance with claim 5 which includes the step of removing water of poor quality from said reservoir and replacing the removed water with better quality water.

8. A process in accordance with claim 5 which includes the step of taking water from a source remote from said reservoir and adding it to said reservoir.

9. A process in accordance with claim 5 which includes converting arid or semi-arid land into crop supporting land by pumping water into said reservoir so as to build up the moisture content of the soil to the extend that agricultural crops are sustainable on the resultant water-containing soil.

10. A process in accordance with claim 5 which includes the step of increasing the capacity of said underground reservoir by extending said reservoir walls above the ground.

* * * * *